June 11, 1929.    W. H. MARKLAND    1,716,861
SURFACING MACHINE
Filed June 21, 1923
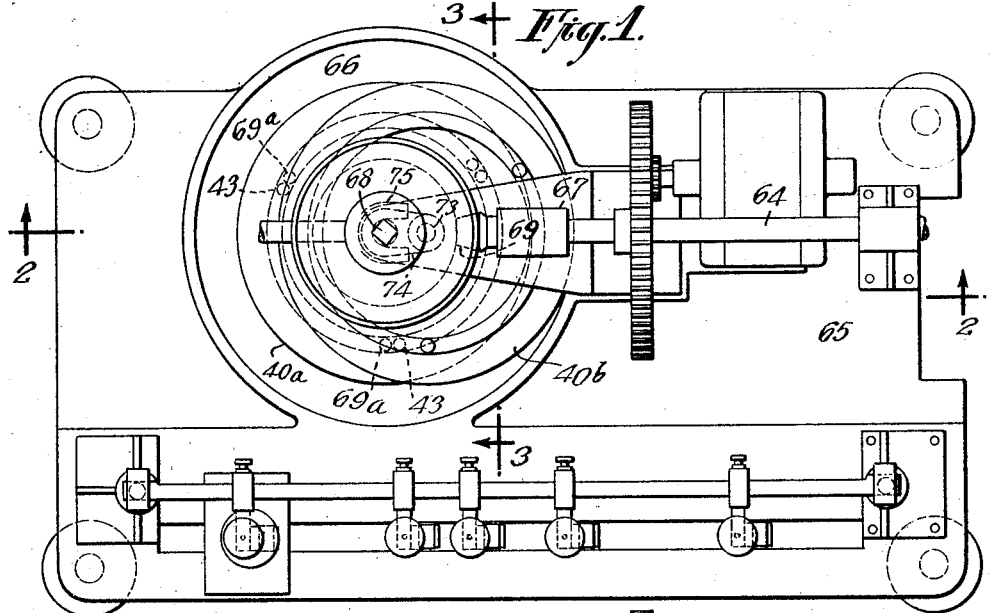
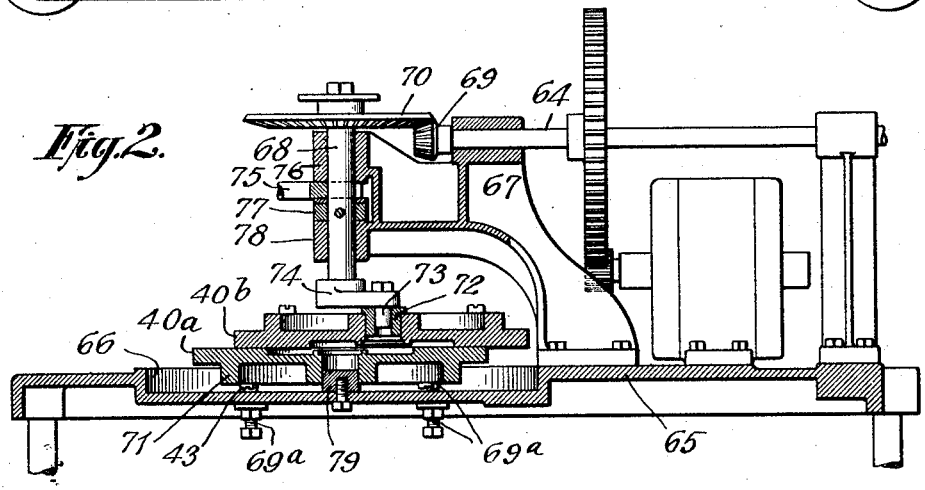
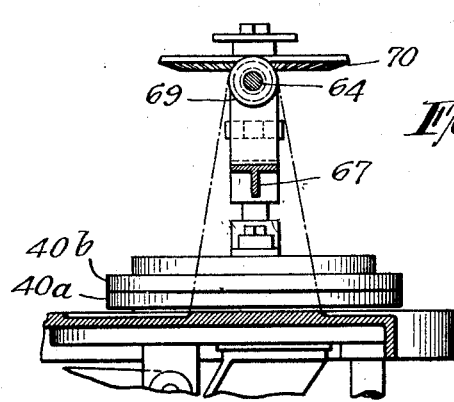
Inventor
WYLLIS H. MARKLAND.
By His Attorney

Patented June 11, 1929.  1,716,861

UNITED STATES PATENT OFFICE.

WYLLIS H. MARKLAND, OF ALTOONA, PENNSYLVANIA, ASSIGNOR TO WALTER H. FOSTER, OF NEW YORK, N. Y.

SURFACING MACHINE.

Original application filed January 19, 1922, Serial No. 530,351. Divided and this application filed June 21, 1923. Serial No. 646,734.

This application is a division of my application Serial Number 530,351 filed January 19, 1922. In said previous application I have disclosed a machine for surfacing various parts of valves or other articles requiring a perfectly flat face. The machine described is provided with various sections for surfacing work of different character and includes a section for trueing up, or maintaining perfectly flat, certain surfacing plates used in the machine. The present application is directed to the means for trueing or surfacing of rubbing or surfacing plates such as are used in lapping or polishing machines.

An embodiment of the invention is illustrated in the accompanying drawings in which Fig. 1 is a plan view; Fig. 2 is a vertical section on line 2—2 of Fig. 1; Fig. 3 is a transverse section on line 3—3 of Fig. 1.

Referring to the drawings in detail, the surfacing plates 40$^a$ and 40$^b$ shown in Fig. 1 are duplicate members placed face to face, which have been previously used to polish or finish flat pieces of work such as valve parts, piston rings and the like. In the course of time such plates become worn and in order to prepare them for re-use on work requiring great accuracy it is desirable to frequently true or dress them. Indeed for continuous operation in a shop devoted to the class of work requiring lapped parts, perfect work can be turned out only by maintaining perfect rubbing plates. The mechanism for resurfacing the plates is driven from a shaft 64 at the rear of the table 65, in which is a depressed circular bed 66, Figs. 1 and 2. A bracket 67 overhangs the depressed bed 66 and provides a bearing for the shaft 64 and and for a vertical shaft 68 which is driven from the horizontal shaft by means of a bevelled pinion and gear 69, 70. On the bottom of the bed 66 there are three levelling set screws 69$^a$ on which rests one of the surfacing plates or discs 40 which are used in the second section of the machine, described in my previous application. For the sake of distinction I have marked this 40$^a$ in Figs. 2 and 3. The plate, through its flange 71, rests on the levelling screws 69$^a$ and one of the pins or screws 43 which project downward from the flange is engaged by one of the levelling screws 69 to prevent the disc from rotating. On top of this a second disc 40$^b$ rests face downward, its central opening fitting over a bushing 72 on a pin 73 on the end of a crank 74 on the lower end of the vertical shaft 68. The crank shaft is held down by means of a fork 75 which is inserted between the lower side of the bearing 76 and a collar 77 on the shaft which rests on a lower bearing 78. For inserting the crank pin on the disc, the fork 75 is withdrawn and the crank shaft lifted by hand. The bushing is then placed in the disc and the crank pin dropped into the bushing and the fork 75 inserted to hold the shaft down. The lower disc 40$^a$ is centralized by means of a boss 79 on the bed plate.

The rotation of the shaft causes the upper disc to rub the lower one with an eccentric motion, at the same time rotating the upper plate about its rotating center. Abrasive may be placed between the plates to increase the wearing action. The two plates wear on each other until they have both been brought to a perfect level (or until one of them has been brought to this condition if we assume that the other was level in the beginning). The fork 75 is then removed, the crank shaft lifted and the fork placed under the collar 77 to hold it there, which stops the rotation of the shaft by unmeshing the gears and permits the removal of the upper disc, and of course of the lower one.

In the continuous operation of the polishing or lapping machine of which the mechanism above described is an adjunct, three discs will be used. One will be in use surfacing work in another section of the machine, not shown, and the other two will be in the part of the machine illustrated, being trued up. As any disc will true any other, it is advisable to place the worn disc last removed from working position always on the bottom and to advance it to the top when another worn disc is to be re-surfaced.

Though I have described with great particularity of detail certain embodiments of my invention yet it is not to be understood therefrom that the invention is restricted to the particular embodiments disclosed. Various modifications thereof in detail and in the arrangement of the parts may be made by those skilled in the art without departure from the invention as defined in the following claims.

What I claim is—

1. A surfacing machine comprising in combination adjustable levelling means for holding a rubbing plate in horizontal position, a shaft arranged to be moved vertically to facilitate insertion and removal of the work, an arm on said shaft having a crank pin adapted to engage the center of a second rubbing plate to position it face to face upon the first rubbing plate and to rotate the second plate on the first and means for normally holding said shaft against axial movement while the crank is in working position, said means being adapted also to hold the crank pin elevated to permit insertion and removal of the plates.

2. A surfacing machine comprising in combination supporting means for holding a rubbing plate in working position, a shaft arranged to be moved vertically to facilitate the insertion and removal of work, a supporting bracket having bearings therein for said shaft, a collar on the shaft, an arm having a crank pin adapted to move a second rubbing plate, a bushing surrounding the crank pin and engaging an opening in said second rubbing plate and a fork co-operating with said collar adapted normally to hold said arm in working engagement with said bushing, said fork being adapted also to engage the underside of said collar to hold the crank pin in elevated position to permit insertion and removal of the work.

In witness whereof, I have hereunto signed my name.

WYLLIS H. MARKLAND.